United States Patent [19]
Plesslinger et al.

[11] 3,926,603
[45] Dec. 16, 1975

[54] METHOD OF MANUFACTURING A GLASS CERAMIC MATERIAL WHICH IS RESISTANT TO SODIUM VAPOUR

[75] Inventors: Gertraud Agnes Anna Plesslinger, Eindhoven, Netherlands; Frank Berthold; Erwin Roeder, both of Aachen, Germany

[73] Assignee: U.S. Philips Corporation, New York, N.Y.

[22] Filed: Nov. 18, 1974

[21] Appl. No.: 524,703

Related U.S. Application Data

[63] Continuation of Ser. Nos. 340,218, March 12, 1973, abandoned, and Ser. No. 813,029, April 3, 1969, abandoned.

[30] Foreign Application Priority Data

Apr. 10, 1968 Germany.............................. 1771143

[52] U.S. Cl..................................... 65/33; 106/39.6
[51] Int. Cl.²........................................... C03C 3/22
[58] Field of Search....................... 106/39.6; 65/33

[56] References Cited
UNITED STATES PATENTS

| 3,007,804 | 11/1961 | Kreidl et al. | 106/39.6 |
| 3,163,513 | 12/1964 | Brown | 65/33 |
| 3,281,309 | 10/1966 | Ross | 106/39.5 |
| 3,441,421 | 4/1969 | Sarver et al. | 106/39.5 |
| 3,469,729 | 9/1969 | Grekila et al. | 106/47 X |
| 3,635,739 | 1/1972 | MacDowell et al. | 106/39.6 |

Primary Examiner—Helen M. McCarthy
Attorney, Agent, or Firm—Frank R. Trifari; George B. Berka

[57] ABSTRACT

A method of manufacturing a glass ceramic body which is resistant to sodium vapor at a high temperature, comprises: shaping the body from a glass prepared by melting a mixture consisting of a composition in % by weight within the limits CaO 24–50, $Al_2O_3$ 35–57.5, MgO 0–12, BaO 0–16, $Y_2O_3$ 0–10, $B_2O_3$ 0–9, $ZrO_2$ 0–17.5 and $Li_2O$ 0–13, heating the body for 30 to 120 minutes at a temperature between 700° and 900°C, then for 0 to 120 minutes between 900° and 1000°C. then for 60 to 360 minutes at a temperature between 1000° and 1200°C.

2 Claims, No Drawings

METHOD OF MANUFACTURING A GLASS CERAMIC MATERIAL WHICH IS RESISTANT TO SODIUM VAPOUR

This is a continuation of application Ser. No. 340,218, filed Mar. 12, 1973, and Ser. No. 813,029, filed Apr. 3, 1969, now abandoned.

The invention relates to a method of manufacturing a glass ceramic material which is resistant to sodium vapour and to discharge lamps in which either the connection between the envelope consisting of densely sintered polycrystalline material, for example, aluminium oxide, and the electrode metal consists of the glass ceramic material manufactured by said method, or in which the envelope itself consists wholly or partly of said glass ceramic material.

Densely sintered polycrystalline aluminium oxide, (U.S. patent specification No. 3,026,210) consists at least of 99.5% of $Al_2O_3$. It is translucent, gas-tight and has an excellent resistance to the action by sodium vapour up to very high temperatures. This material is therefore used as an envelope for high pressure sodium vapour discharge lamps.

The sealing of said lamps and the sealing-in of the electrodes was not so simple up till now. It was proposed inter alia (U.S. patent specification No. 3,281,309) to use for this purpose melted eutectic mixtures on the basis of alkaline earth oxide and $Al_2O_3$ which upon solidification produce a vitreous crystalline product. The crystalline phases in most of the compositions of this type are formed spontaneously and rapidly, so uncontrolled. As a result of this the mechanical rigidity and the gas-tightness of the resulting connection is strongly reduced. Actually, said material can only be useful as a cement and is unfit for the manufacture or rather large bodies.

In manufacturing sodium vapour discharge lamps it was so far necessary to use terminating or inserting members of densely sintered polycrystalline aluminium oxide. The result of this is that due to the matching of the coefficients of expansion, the metal must consist of niobium which has the drawback that sealing together has to be carried out in a rare gas.

According to the method of the invention, a glass ceramic material is manufactured which is resistant to the action of sodium vapour and in which the crystalline phase is very fine-granular. This glass ceramic material is therefore not only suitable as a readily adhering gas-tight sealing material, but is also suitable for manufacturing bodies.

The method according to the invention is characterized in that a glass which, by melting of a mixture having a composition in % by weight calculated as an oxide, is obtained within the limits

| CaO | 24 – 50 | |
|---|---|---|
| $Al_2O_3$ | 35 – 57.5 | |
| MgO | 0 – 12 | |
| BaO | 0 – 16 | |
| $Y_2O_3$ | 0 – 10 | |
| $B_2O_3$ | 0 – 9 | $B_2O_3 + ZrO_2 + Li_2O$ |
| $ZrO_2$ | 0 – 17,5 | 3 – 20 |
| $Li_2O$ | 0 – 3 | | is first heated for 30 to 120 minutes at a temperature between 700° and 900°C, then from 0 to 120 minutes between 900° and 1000°C and finally for 60 to 360 minutes between 1000° and 1200°C.

The resulting glass ceramic material which is finely crystalline has a sodium vapour resistance, as compared with glass of the same composition, which is satisfactory up to temperatures which are approximately 200°C higher, so to approximately 900°C. For an envelope of a high pressure sodium vapour discharge lamp it is not yet suitable. On the other hand, it may be used as an envelope when medium pressures are used. A number of glass ceramic materials within the above range of compositions have a translucency which is comparable to that of densely sintered aluminium oxide. They are suitable for being processed, for example, to tubular bodies by means of the extrusion method, which is described in the British patent application Ser. No. 48,318/68 (U.S. Appl. Ser. No. 765,671 now abandoned) which have not yet been laid open to public inspection.

According to a preferred embodiment of the method according to the invention, a glass which is obtained by melting a mixture of the composition in % by weight calculated as an oxide, within the limits.

| | |
|---|---|
| CaO | 30 – 50 |
| $Al_2O_3$ | 35 – 55 |
| MgO | 2 – 7 |
| BaO | 4 – 16 |
| $Y_2O_3$ | 0 – 10 |
| $B_2O_3$ | 3 – 9 |
| $ZrO_2$ | 0 – 10 | is first heated for 30 to 120 minutes at a temperature between 700° and 900°C, then for 30 to 120 minutes between 900° and 1000°C, and finally for 60 to 240 minutes between 1000° and 1200°C.

The treatment in three stages, that is to say including a treatment at a temperature between 900° and 1000°C between the formation of nuclei and the nuclei growth reduces the danger of the formation of cracks in the material considerably.

In manufacturing high pressure sodium vapour lamps, having an envelope of densely sintered polycrystalline aluminium oxide, the glass ceramic material which is manufactured according to the invention presents the possibility of a much simpler sealing than the one used so far.

FIG. 1 shows a known sealing. In this Figure, reference numeral 1 denotes the tubular envelope of densely sintered aluminium oxide, in which an annular member of the same material is provided in a clamping manner at either end. The ring 4 likewise consists of the same material. Niobium is used as an electrode lead-in member 2, while the two rings 5 consist of a compressed glass powder mixed with a binder. The glass has, for example, the composition (in % by weight): CaO 38.8; $Al_2O_3$ 45.6; MgO 5.2; BaO 8.7 and $B_2O_3$ 1.7, according to the British patent application Ser. No. 17.827/68 (U.S. Appl. Ser. No. 720,302 now abandoned). Upon heating, the binder burns away and forms a vacuum-tight connection between the envelope and the elctrode lead-in member.

FIG. 2 shows how the sealing with the material according to the invention is carried out much simpler. According to this method the plug of glass 7 which consists of one assembly is converted, after sealing-in, by a suitable thermal treatment into the glass ceramic material according to the invention. In this method of sealing the electrode lead-in member 6 may consist, for example, of molybdenum which is much cheaper.

In carrying the invention into effect it has been found that in the first phase of the thermal treatment finely divided nuclei, for example, in the form of 3 $CaO.B_2O_3$ segregate in the glass. During the further thermal treatment the compound $CaO.Al_2O_3$ which is excellently resistant to the action by sodium vapour crystallizes on said nuceli. Decisive of a suitable glass ceramic material is the choice of the composition and of the temperature program since in addition to $CaO.Al_2O_3$ the phase 12 CaO. 7 $Al_2O_3$ which is very poorly resistant to the action by sodium vapour may also be separated.

The material obtained according to the invention cannot only be used as a sealing material for high pressure sodium lamps or for medium pressure sodium lamps but also for other high load lamps.

In order that the invention may readily be carried into effect, it will now be described in greater detail with reference to a few examples. The compositions summarized in the table in % by weight are melted from a mixture which contains calcium carbonate, aluminium oxide, boric acid, and, if required, magnesium carbonate, barium carbonate, zirconium oxide and yttrium oxide. Rods drawn from the melt are first heated at a temperature betwen 750° and 850°C for 2 hours. The temperature is then raised at a rate of 4° to 5°C per minute to 950°C and kept at this value for 1 hour. The temperature is then increased once again at a rate of 4° to 5°C. per minute to 1100°C, kept at the last-mentioned temperature for 2 to 4 hours, and finally cooled in air to room temperature.

The sodium resistance is very good for all samples after a treatment at 850°C for 48 hours. In the samples 1, 2 and 6, such a load at 950°C causes hardly any attack.

What is claimed is:

1. A method for manufacturing a translucent glass ceramic body shaped of a glass produced by melting a mixture consisting of a composition in percentage by weight calculated as an oxide within ranges

| | |
|---|---|
| CaO | 30 – 50 |
| $Al_2O_3$ | 35 – 55 |
| MgO | 2 – 7 |
| BaO | 4 – 16 |
| $Y_2O_3$ | 0 – 10 |
| $B_2O_3$ | 3 – 9 |
| $ZrO_2$ | 0 – 10 | comprising devitrifying said glass body by heating it at temperatures between 700° and 900°C for time periods between 30 and 120 minutes to form 3 $CaO.B_2O_3$ nuclei; then heating said body to a temperature between 900° and 1000°C and maintaining said temperature between 900° and 1000°C for a time period of 30 to 120 minutes, then heating said body to a temperature between 1000° and 1200°C and maintaining said temperature between 1000° and 1200°C for a time period between 60 and 240 minutes to crystallize $CaO.Al_2O_3$ compound on said nuclei, said compound having a high resistance to the action of sodium vapor at high temperatures, and finally cooling said body.

Table.

| Nr | Composition % by weight. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| CaO | 37,2 | 38,0 | 36,3 | 34,5 | 36,7 | 36,8 | 47,9 | 46,2 | 34,4 | 34,5 | 29,3 | 41,8 |
| $Al_2O_3$ | 43,4 | 44,4 | 42,3 | 40,4 | 40,4 | 43,0 | 43,6 | 46,9 | 40,2 | 50,3 | 46,7 | 52,0 |
| MgO | 4,9 | 2,8 | 2,6 | 2,5 | 2,7 | 5,9 | — | — | 4,5 | — | 7,9 | — |
| BaO | 8,3 | 8,5 | 8,2 | 7,9 | 8,3 | 8,2 | — | — | 15,3 | — | — | — |
| $B_2O_3$ | 6,2 | 6,3 | 6,0 | 5,7 | 6,1 | 6,1 | 8,5 | 6,9 | 5,6 | — | — | — |
| $ZrO_2$ | — | — | 4,6 | 9,0 | — | — | — | — | — | 15,2 | 16,1 | 4,2 |
| $Y_2O_3$ | — | — | — | — | 5,8 | — | — | — | — | — | — | — |
| $Li_2O$ | — | — | — | — | — | — | — | — | — | — | — | 2,0 |

The phases 3 $CaO.B_2O_3$ and CaO $Al_2O_3$ can be detected in an X-ray diffraction pattern in the final product. The phase 12 CaO. 7 $Al_2O_3$ is present in traces.

2. A method as claimed in claim 1, wherein heating said body to temperatures between 900° and 1000°C and between 1000° and 1200°C comprises temperature increases at rates between 4° and 5°C per minute.

* * * * *